United States Patent [19]

Fawcett

[11] 4,050,002
[45] Sept. 20, 1977

[54] FEEDBACK SIGNAL GENERATOR FOR A SERVO CONTROL CIRCUIT

[75] Inventor: Howard N. Fawcett, Briarcliff Manor, N.Y.

[73] Assignee: Cambridge Instrument Company, Inc., Ossing, N.Y.

[21] Appl. No.: 615,928

[22] Filed: Sept. 23, 1975

[51] Int. Cl.² .............................................. G05B 1/06
[52] U.S. Cl. .................................................. 318/661
[58] Field of Search ............... 318/653, 654, 655, 659, 318/660, 661, 656; 336/79, 123–127, 182, 183

[56] References Cited

U.S. PATENT DOCUMENTS

| | | | |
|---|---|---|---|
| 2,093,158 | 9/1937 | Pratt | 336/123 |
| 2,094,039 | 9/1937 | Kinsley | 318/653 |
| 2,336,994 | 12/1943 | MacKay | 318/656 |
| 3,052,859 | 9/1962 | Bers | 336/127 |
| 3,771,085 | 11/1973 | Hojo et al. | 336/182 |

Primary Examiner—Robert K. Schaefer
Assistant Examiner—John J. Feldhaus
Attorney, Agent, or Firm—Eugene E. Geoffery, Jr.

[57] ABSTRACT

Apparatus for generating a feedback signal for effecting rotation of a servo motor precisely in accordance with changes in the input signal and which includes a first annular coil and two angularly positioned coils inductively coupled with the first coil. An alternating current signal is fed to the first coil and the voltages induced into the angularly positioned coils are rectified and subtracted to produce the feedback signal. Variations in the feedback signal are effected by mechanically coupling the shaft of the servo motor with said coils to produce rotation of the first coil relative to said angularly positioned coils. An electronic network is provided to effect rectification and subtraction of the induced AC signals and a corrective network may be included for additional accuracy, if desired.

5 Claims, 8 Drawing Figures

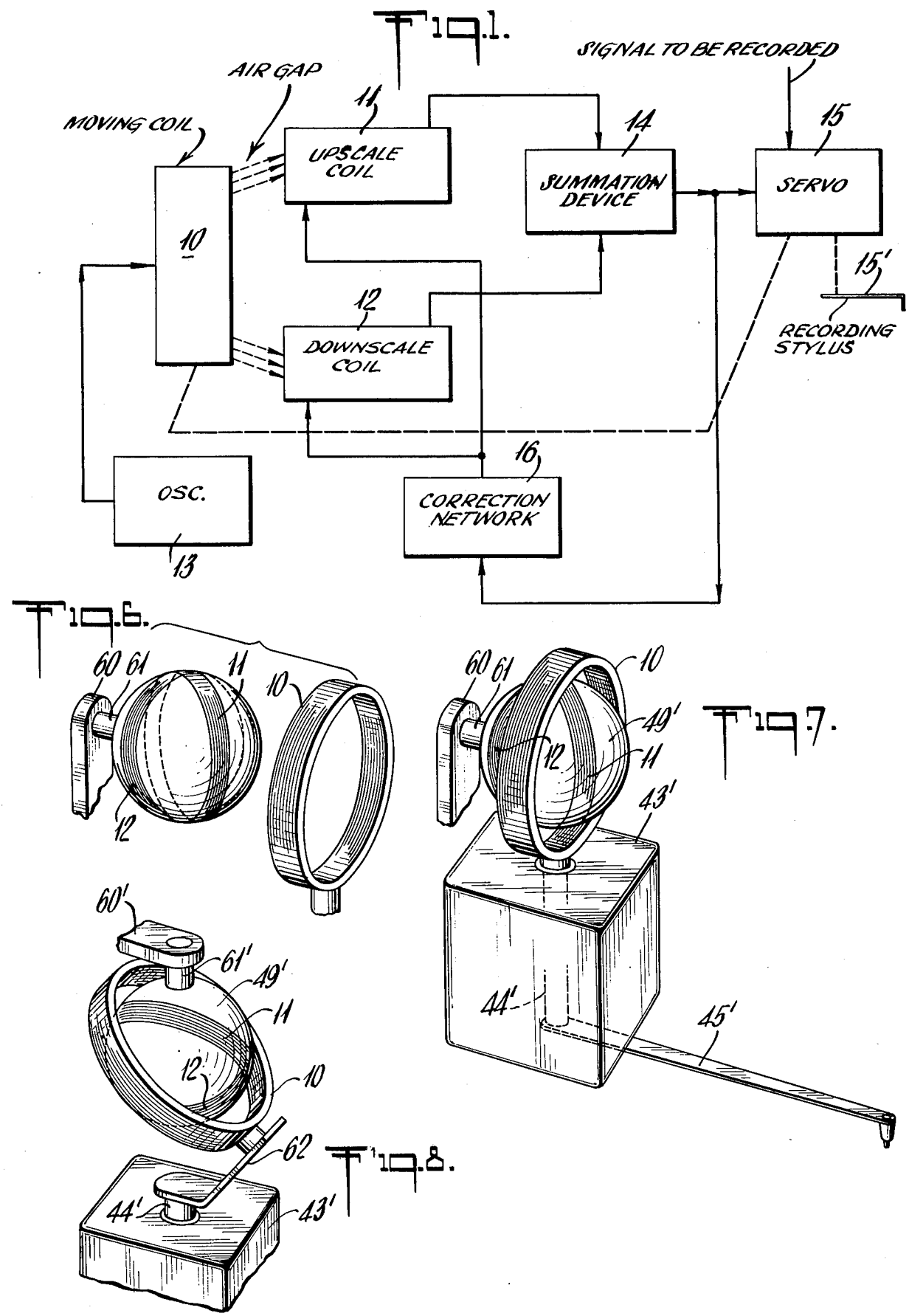

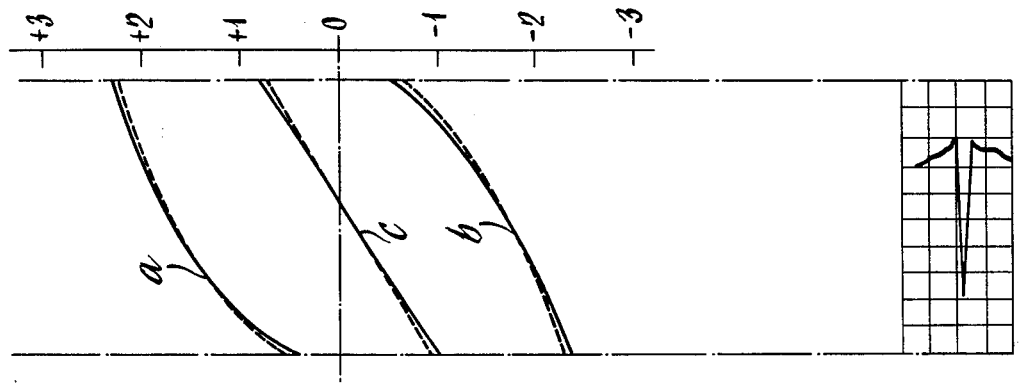
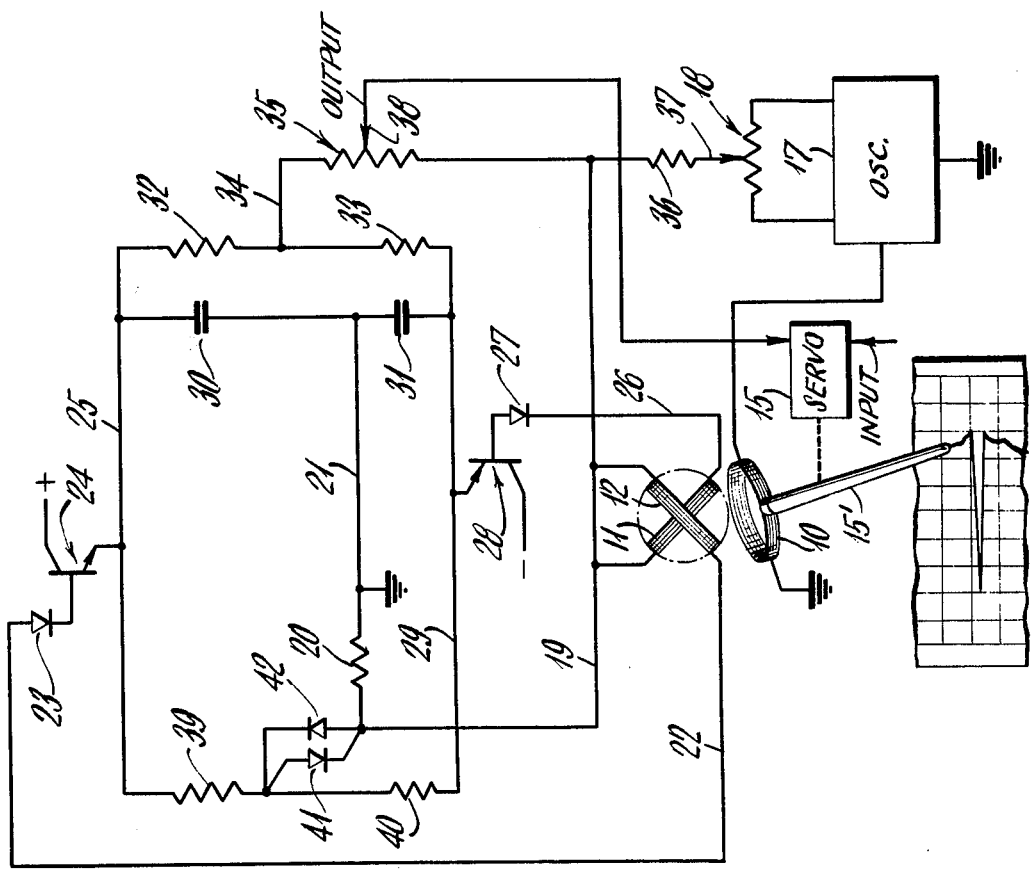

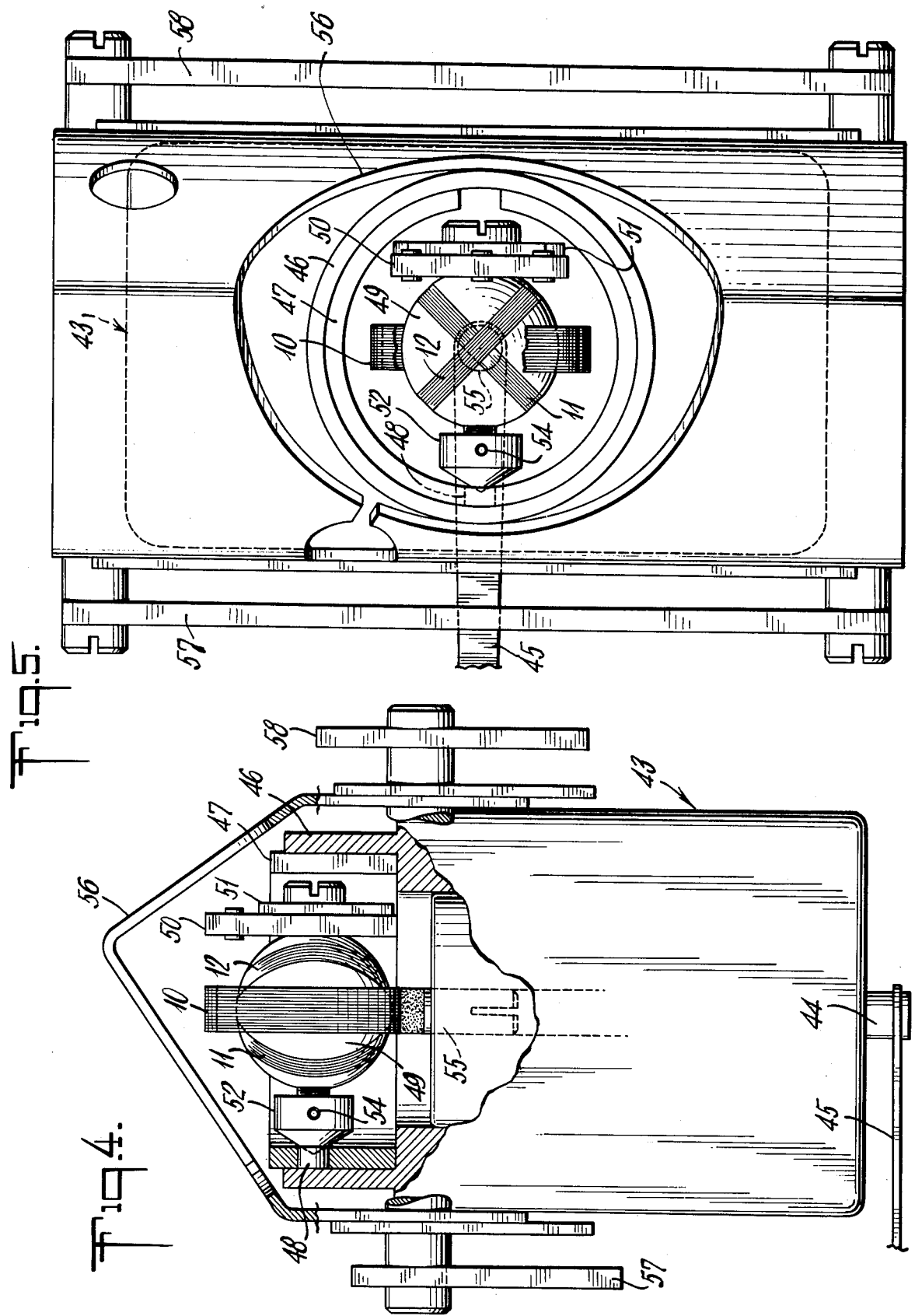

FEEDBACK SIGNAL GENERATOR FOR A SERVO CONTROL CIRCUIT

This invention relates to servo contro circuits for recording instruments and more specifically to a novel and improved feedback circuit for a magnetically driven recording stylus to effect substantially linear response over a wide range of frequencies and amplitudes of the input signal.

In prior servo control circuits a potentiometer coupled to the servo shaft driving the stylus was used to produce a DC signal which in turn was fed back to the driving motor of the recording stylus together with a component of the drive current in order to effect linear motion of the recording stylus in accordance with the drive signal. While such a system provided good linearity, the potentiometer presented problems because of the basic nature of the device and the problems entailed in producing the resistance element. This invention provides a novel and improved arrangement and organization of elements to produce a highly precise DC voltage proportional to stylus deflection which enables the attainment of an extremely high degree of linearity not heretofore obtainable with known systems.

Another object of the invention resides in the provision of a novel and improved rotary transducer system particularly adaptable for use with servo motors or galvanometers having driven stylii which will produce a DC voltage proportional to the displacement of the stylus and which is utilized to control the movement of the stylus.

Still another object of the invention resides in the provision of a novel and improved rotary inductive structure and associated circuitry for producing a DC signal proportional to rotation.

The above and other objects and advantages will become more apparent from the following description and accompanying drawings forming part of this application.

In the Drawings:

FIG. 1 is a block diagram of one embodiment of a rotary transducer system in accordance with the invention, FIG. 2 is a circuit diagram and partially exploded view of the transducer for use in producing a DC voltage proportional to rotation, FIG. 3 is a graph illustrating the voltage components used to produce the resultant DC voltage, FIG. 4 is a side elevational view in partial section of a servo motor and transducer coupled thereto in accordance with the invention, FIG. 5 is a top view in partial section of the structure shown in FIG. 4, FIG. 6 is an exploded view of the transducer elements of FIGS. 4 and 5, FIG. 7 is a perspective view of a servo motor with the transducer coupled thereto, and FIG. 8 is a modified form of the transducer shown in FIG. 7.

Referring now to the drawings and more specifically to FIG. 1, the numeral 10 denotes a moving coil inductively coupled to annularly wound intersecting coils 11 and 12. A sinusoidal voltage is applied to coil 10 by the oscillator 13 and voltages are therefore induced into the coils 11 and 12. The magnitudes of the induced voltages are proportional to the physical relationship of the coil 10 to the coils 11 and 12. The outputs of coils 11 and 12 are then fed to a summation device and the resultant output is fed to the servo drive 15 which is mechanically coupled to the moving coil 10 and to a stylus 15'. Since the servo is activated by a driving signal to be recorded, the voltage produced by the summation device functions to balance the driving signal. In so doing, the voltage from the summation device must be substantially linear in order to achieve a high degree of recording accuracy and this may be accomplished by feeding a portion of the output signal from the summation device 14 through a correction network 16 to the fixed coils 11 and 12. In actual practice, it has been found that by positioning the coils 10, 11 and 12 in a specific manner, as will as described, linearity compensation is not required for stylus excusions of the order of ±30° with errors not exceeding 1%.

One circuit for achieving the objects outlined above is illustrated in FIG. 2. In this Figure, the coils 10, 11 and 12 are shown diagrammatically and in spaced relationship for purposes of clarity. In the illustrated structure, coils 11 and 12 are circular and positioned at 90° one relative to the other, and the coil 10 surrounds the coils 11 and 12 and is rotated by the servo 15. Coils 11 and 12 are effectively in intersecting relationship and are uniformly positioned relative to the axis of intersection. An oscillator 17 producing a high frequency sinusoidal signal, such as a signal of the order of 300 to 400 KHz is connected to the coil 10 and is energized by an 18 volt DC supply which is also applied to the ends of the potentiometer 18.

When the stylus is positioned at mid-scale, the coil 10 is at 45° relative to each of the coils 11 and 12 and equal voltages will be induced in coils 11 and 12. As will be shown, these voltages will be rectified and subtracted so that with the stylus at mid-scale, the resultant voltage will be zero.

More specifically, one side of each coil 11 and 12 is connected through conductor 19, resistor 20 and conductor 21 to ground. The other side of coil 12 is connected through conductor 22 and diode 23 to the base of an NPN emmitter-follower transistor 24. The collector of this transistor is connected to a positive DC voltage, while the emitter is connected to conductor 25. The other side of coil 11 is connected through conductor 26 and diode 27 to the base of a PNP emitter-follower transistor 28. The collector of this transistor is connected to a negative DC voltage while the emitter is connected to conductor 29. It is evident therefore that oppositely polarized voltages appear on conductors 25 and 29. These conductors are each bypassed to ground through condensers 30 and 31 and connected through resistors 32 and 33 to the output conductor 34. Conductor 34 is connected through the output potentiometer 35 and resistor 36 to the moving contact 37 on potentiometer 18 which functions to provide a zero on offset adjustment. The output voltage is obtained from the moving contactor 38 on potentiometer 35 and is fed to the servo 15 usually through an amplifier which also feeds the signal to be recorded to the servo.

With the circuit thus far described, two sinusoidal functions displaced 90° one from the other are produced and the resultant voltages are illustrated in FIG. 3 and denoted by the letters a and b and the difference is denoted by the center curve c. The dashed portions of the curves indicate in exaggerated form slight non-linearities which are less than 1% at the extreme excursions of the stylus when recording on charts of the order of 50 millimeters in width. Compensation of these minor non-linearities may be effected by the correction circuit which includes resistors 39 and 40 and diodes 41 and 42. Resistor 20 is also utilized in the correction circuit but is not otherwise required. With this arrangement, when either diode 41 or 42 conducts, an exponentially increasing current flows through resistor 20 and the resultant voltage is algebraically added to the voltage in conductor 19. This results in a small readjustment of the AC voltages and produces voltages illustrated by the solid lines a and b in FIG. 3. Furthermore, potentiometer 18 and resistor 36 functions to produce a small current through resistor 20 to compensate for small mechanical misalignments of the coil and stylus assemblies and potentiometer 35 permits adjustment of the output voltage. Tests have indicated that little if any error is experienced with excursions of ±30° while without the correction circuit excursions of ±15° can be obtained with little if any error.

One example of a structure embodying the invention is shown in FIGS. 4 and 5. The servo or galvanometer is generally denoted by the numeral 43 and includes a shaft 44 carrying, on one end, a stylus arm 45. The other end of the servo has an upwardly extending sleeve 46 having an inner sleeve 47 fixed therein which has a hole 48. A spherical member 49 preferably of a non-magnetic material carries coils 11 and 12 spaced at 90°. The ball or spherical member 49 is held in position by a support assembly including an insulating plate 50, a metal plate 51 and member 52 having a conical surface engaging opening 48. A screw 53 extends through the ball 49 and rotatably engages the member 52. In this way, rotation of the screw 53 will facilitate alignment of the ball 49 with the servo shaft and a screw 54 will lock the screw 53 in position. The coil 11 surrounds the ball 49 and has a shaft 55 engaging the servo shaft 44. The coil assembly is enclosed by a housing 56 secured to the servo 43 and printed ccircuit boards 57 and 48 carrying the electronic components illustrated in FIG. 2 may be secured to the sides of housing 56. It is evident of course that other structural configurations may be used as for instance that shown in FIGS. 6 and 7.

Referring to FIGS. 6 and 7, the servo 43' which may be mounted in any suitable manner carries the stylus arm 45' on the lower end of shaft 44'. The upper end of shaft 44' carries the coil 10 while the coils 11 and 12 on ball 49' are supported by a bracket 60 and shaft 61.

A modified physical arrangement of the coils 10, 11 and 12 is shown in FIG. 8. In this embodiment of the invention, the coil 11 is positioned at an angle relative to the shaft 44' of servo 43' by means of the bracket 62. The coils 11 and 12 carried by ball 49' are also shifted angularly and supported by the bracket 60' and 61'. With this arrangement and with coil 11 at 45' to the shaft 44' and the coils 11 and 12 shifted 90° from the position shown in FIG. 7 greater excursions of the stylus arm are obtainable with equivalent linearities. For instance it has been found that double the excusion of the arm is possible with equivalent accuracies obtainable with the embodiment of the invention as shown in FIG. 7.

While the coils 10, 11 and 12 have been illustrated as circular in configuration, they may take the form of a rectangle or other multi-sided configuration. Accordingly, the term "annular" as used in the claims is intended to define a coil of circular as well as a multi-sided configuration.

While only certain embodiments of the invention have been illustrated and described, it is understood that alterations, changes and modifications may be made without departing from the true scope and spirit thereof.

What is claimed is:

1. Means for generating a feedback signal for a servo motor having a rotatable shaft comprising a first coil, second and third coils angularly disposed one relative to the other and inductively coupled with the first coil, means for feeding an AC voltage to the first coil to induce AC voltages in the second and third coils, means coupled to said shaft and at least one coil for effecting relative movement about an axis between the first coil and the second and third coils, and means for combining the voltages of the second and third coils to produce a feedback voltage, said second and third coils each having an annular configuration and are positioned in intersecting relationship and said first coil is of annular configuration and greater in size than the second and third coils to permit rotation thereof about an axis relative to the second and third coils, the axis defined by the intersections of the second and third coils being inclined relative to the axis of rotation and the plane defined by said first coil is inclined relative to the axis of rotation and the axis of said second and third coils.

2. Means for generating a feedback signal according to claim 1 wherein the axis defined by the intersection of the second and third coils is normal to said axis of relative movement, and the plane of said first coil is disposed at 45° to the last said axis.

3. Means for generating a feedback signal for a servo motor having a rotatable shaft comprising a first coil, second and third coils angularly disposed one relative to the other and inductively coupled with the first coil, means for feeding an AC voltage to the first coil to induce AC voltages in the second and third coils, means coupled to said shaft and at least one coil for effecting relative movement about an axis between the first coil and the second and third coils, and means for combining the voltages of the second and third coils to produce a feedback voltage, said second and third coils each having an annular configuration and are positioned in intersecting relationship and said first coil is of annular configuration and greater in size than the second and third coils to permit rotation thereof about an axis relative to the second and third coils, the means for combining the voltages of said second and third coils comprising means for rectifying each of the last said voltages to produce two DC voltages of opposite polarity, a resistive network for combining said voltages to produce an output signal and a correction network connected between said second and third coils to produce a voltage for compensating for nonlinearities in the feedback voltage.

4. Means for generating a feedback signal for a servo motor having a rotatable shaft comprising a first coil, second and third coils angularly disposed one relative to the other and inductively coupled with the firt coils, means for feeding an AC voltage to the first coil to induce AC voltages in the second and third coils, means coupled to said shaft and at least one coil for effecting relative movement about an axis between the first coil and the second and third coils, and means for combining the voltages of the second and third coils to produce a feedback voltage, said second and third coils each having an annular configuration and are positioned in intersecting relationship and said first coil is of annular configuration and differing in size from the second and third coils to permit rotation thereof about an axis relative to the second and third coils, the means for combining the voltages of said second and third coils comprising means including at least one resistor connecting one side of each of said coils and ground, means interconnected with the other side of each coil for rectifying said voltages to produce DC voltages of opposite polarity, an output terminal, resistors coupling each of said DC voltages to said output terminal, capacitors connected between each of said DC signals and ground, a pair of series connected resistors connected between the other sides of each coil and a pair of oppositely polarized diodes connecting said one side of each coil to the junction of said series connected resistors to compensate for nonlinearities in the feedback voltage.

5. Means for generating a feedback signal according to claim 4 wherein the axis defined by the intersection of the second and third coils is normal to said axis of relative movement, and the plane of said first coil is disposed at 45° to the last said axis.

* * * * *